United States Patent [19]

Tsubota

[11] Patent Number: 4,535,584
[45] Date of Patent: Aug. 20, 1985

[54] DEVICE FOR BONDING AN ARTICLE TO A COMMODITY

[75] Inventor: Nobutaka Tsubota, Kyoto, Japan

[73] Assignee: Tetra Pak International Akteibolag, Alle Lund, Sweden

[21] Appl. No.: 565,020

[22] Filed: Dec. 22, 1983

[30] Foreign Application Priority Data

Dec. 24, 1982 [JP] Japan ................... 57-232088
Dec. 30, 1982 [JP] Japan ................... 57-234156

[51] Int. Cl.³ ............................................ B32B 31/00
[52] U.S. Cl. ................................... 53/128; 198/689; 493/343
[58] Field of Search ............... 53/128, 410; 198/689, 198/480, 493; 294/64 A, 64 B; 414/31, 52, 43, 72; 493/222, 344, 343

[56] References Cited

U.S. PATENT DOCUMENTS

| 3,408,908 | 11/1968 | Berkowitz | 493/222 X |
| 3,716,307 | 2/1973 | Hansen | 294/64.2 X |
| 3,910,811 | 10/1975 | Paxton et al. | 53/128 X |
| 4,413,984 | 11/1983 | Alter | 493/222 |

Primary Examiner—James F. Coan
Attorney, Agent, or Firm—Koda and Androlia

[57] ABSTRACT

A device for contact bonding an article to a commodity which includes a vacuum transfer device and an adhering device. The vacuum transfer device includes a rotatable transfer drum, a plurality of suction pipes provided on the periphery of the transfer drum and a plurality of Venturi tubes for generating a vacuum when compressed air is passed therethrough. The adhering device is a pusher plate which operates in conjunction with the vacuum transfer device to adhere a package to a commodity and the pusher plate is moved such that it is in synchronism with the circular movement of a bucket wheel and moves in a direction tangential to the bucket wheel adhering device.

4 Claims, 10 Drawing Figures

DEVICE FOR BONDING AN ARTICLE TO A COMMODITY

BACKGROUND OF THE INVENTION

1. Field of the Invention

The present invention relates to devices for contact bonding an article to a commodity and particularly to devices for contact bonding auxiliary goods such as a spoon to a commodity provided in a rotating unit such as a bucket wheel.

2. Prior Art

In an automatic continuous packaging device wherein auxiliary articles such as a spoon and a straw must be adhered to a package container containing a refreshement, for example, the straw or the spoon are first provided in a long and narrow strip of continuous package A' in advance which is cut out to form each of the packages A by a cutter B as shown in FIG. 2. This package A is transmitted by a transmitting drum C and is adhered to a package container E which is fed from another place by rotational units such as bucket wheel which is provided under the transmitting drum C. In order to completely perform the adhesion of the package A to the package container E, it is preferrable to provide the package contact-bonding device as a composite part of the adhering device. Nevertheless, it is not satisfactory that the contact-bonding device only perform the action of simply pressing down the package A to the package container E. That is because if a pushed plate constituting a part of the contact-bonding device works in a direction perpendicular with regard to the external end of the package container E, the pushed plate scrubs the package A against the package container E as it is pressed against the container E since the adhesion process is made between the package A carried on a rotating transferring drum C and the package container E which is carried by rotation of the bucket wheel. For this reason, when the package is covered with a thin film, for example, the film gets torn by the pushed plate so that there is a disadvantage that the packaged article such as the spoon or the straw come out of the package A.

Although there is a necessity of moving the pushed plate to a large extent so that the motion of the pushed plate provided at the outside of the rotating bucket wheel may be made identical to the peripheral velocity of the bucket wheel, the more excessively the pushed plate must be moved the larger the space needed. As a result a disadvantage results in that all the dimensions of the adhering device become larger.

Furthermore, the transfer drum C also has certain disadvantages. In particular in a conventional transfer drum it is necessary that a plurality of suction pipes provided on the transfer drum be connected to single vacuum source. In order to maintain a constant vacuum pressure however, high airtight conditions must be met. In other words, since a slight air leakage will cause an extreme deterioration in the vacuum pressure there is a necessity of providing a passage or joint which is highly airtight on the rotary mechanism. Furthermore, it is required to completely close other suction pipes except for the suction pipes performing the transferring process since the air leakage from one suction pipe will have a considerable impact on the other suction pipes. For this reason the vacuum mechanism of the prior art which has been forced to include movable parts has a structure which is so complicated that the complexity leads to failures and problems.

SUMMARY OF THE INVENTION

Accordingly it is a general object of this invention to provide a transferring and adhering device which overcomes the problems of the prior art.

It is another object of the present invention to provide a transferring and adhering device which is compact and simple in structure.

It is yet another object of the present invention to provide a transferring and adhering device which can transfer and adhere an auxiliary article to a package container without damaging the package in which the auxiliary article is contained.

The above objects are accomplished in a unique adhering device of the type including a roll of long, narrow, continuous package, a means for feeding the continuous package to a cutter, a bucket wheel for picking up a commodity and transferring the commodity to an adhering position and a means for transferring the cut continuous package to an adhering position and for adhering the cut package to the commodity. The means for transferring and adhering includes a vacuum transfer device and a pusher plate. The vacuum transfer device includes a rotatable transfer drum, a plurality of suction pipes provided uniformly about the periphery of the transfer drum, a source for compressed air, a void chamber provided in the drum, a plurality of Venturi tubes for generating a vacuum provided in the void chamber and communicating each with a suction pipe and a pressure chamber provided in the drum to which compressed air is supplied and which supplies compressed air to the Venturi tubes. The pusher plate receives the continuous package from the vacuum transfer device and adheres it to the commodity and the pusher plate is characterized in that it is adapted to make a combined movement including a circular movement in synchronism with the movement of the bucket wheel and a movement in a direction tangential to the bucket wheel.

BRIEF DESCRIPTION OF THE DRAWINGS

The above-mentioned features and objects of the present invention will become more apparent with reference to the following description taken in conjunction with the accompanying drawings wherein like reference numerals denote like elements and in which.

DETAILED DESCRIPTION OF THE INVENTION

Figure 1:
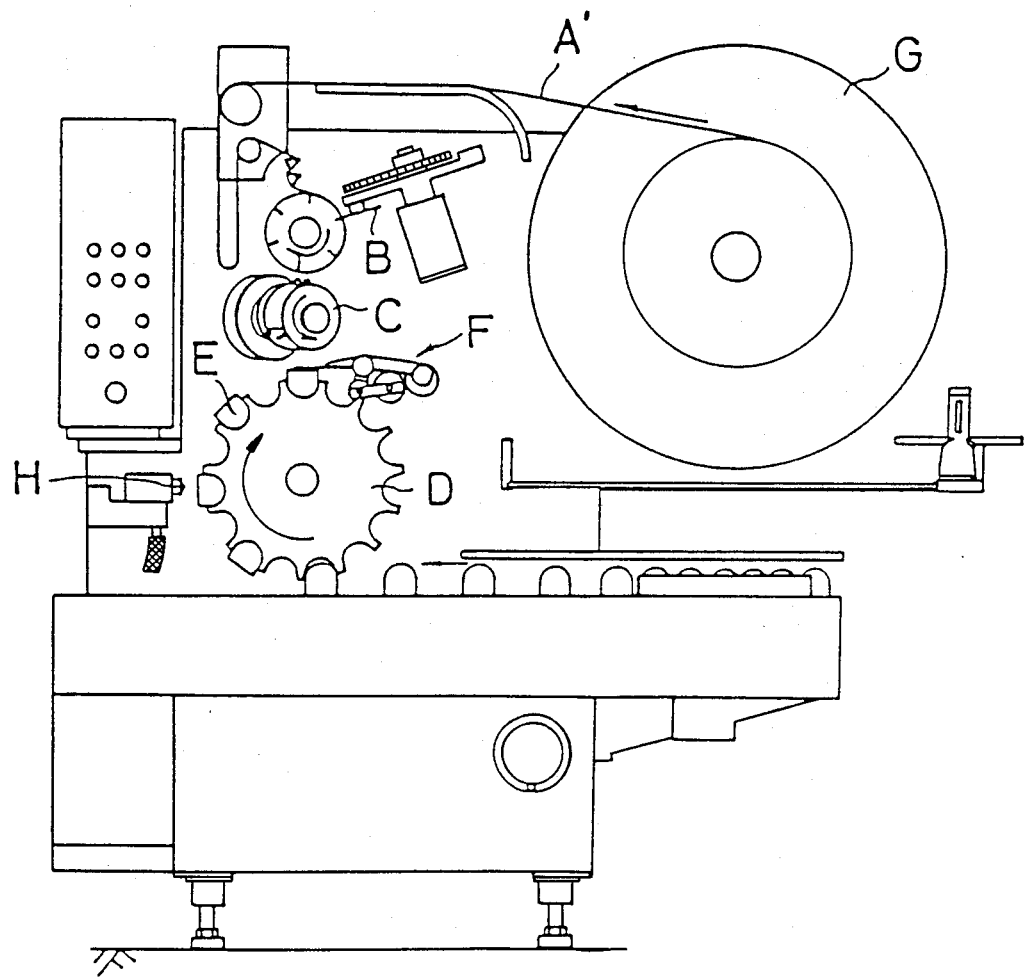
FIG. 1 is a schematic view of an adhering device in accordance with the teachings of the present invention.
Figure 2:
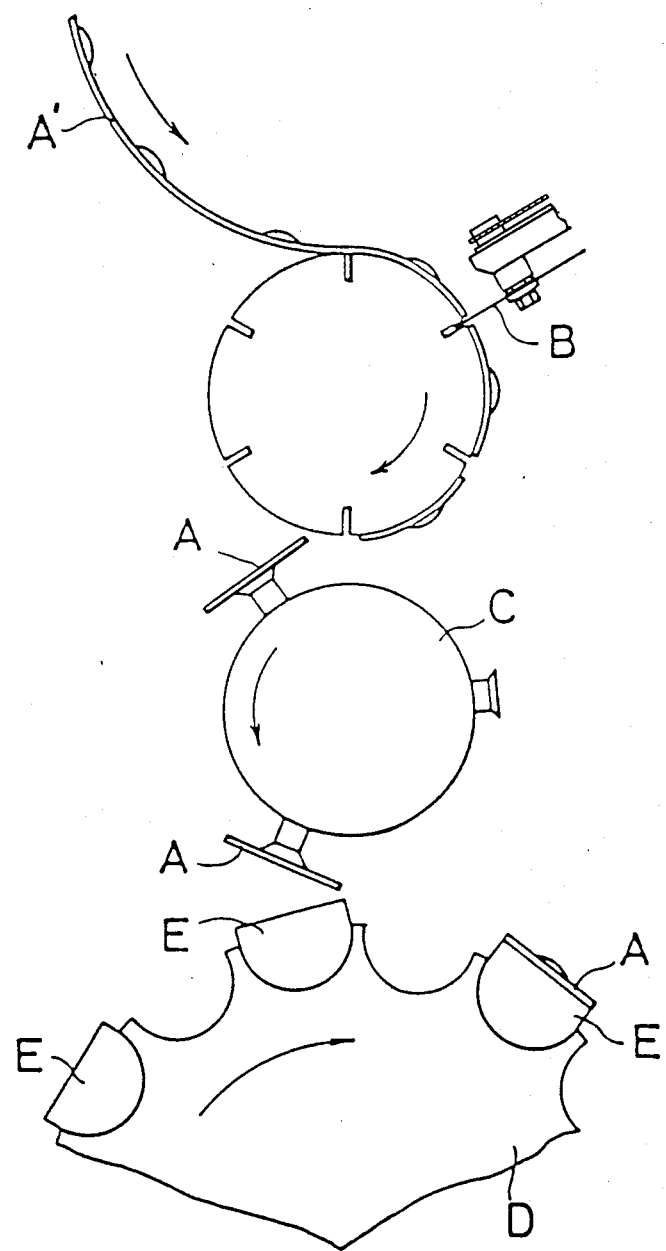
FIG. 2 is a schematic view of illustrating the partial motion of the adhering device of FIG. 1.

In the adhering device of the present invention the continuous packages, which are taken up around a reel, are drawn out in succession as shown in FIG. 1 and during the process they are cut into packages A by a cutter B and the package is transmitted by the transferring drum C. On the other hand, under the transferring drum C the package container E is fed by the rotation of a bucket D. At the position where the package container E faces up to the package A, the package A is adhered to the package container E. During the conveyance caused by the rotation of the bucket wheel D, hot melt adhesive is applied to the external face of the package container E by the adhesive applicator H and the package A is pressed against the applied adhesive whereby the adhering process is much more facillitated. The package contact-bonding device F is provided at this adhering position which is sandwhiched between the transferring drum C and the bucket wheel D.

Figure 3:
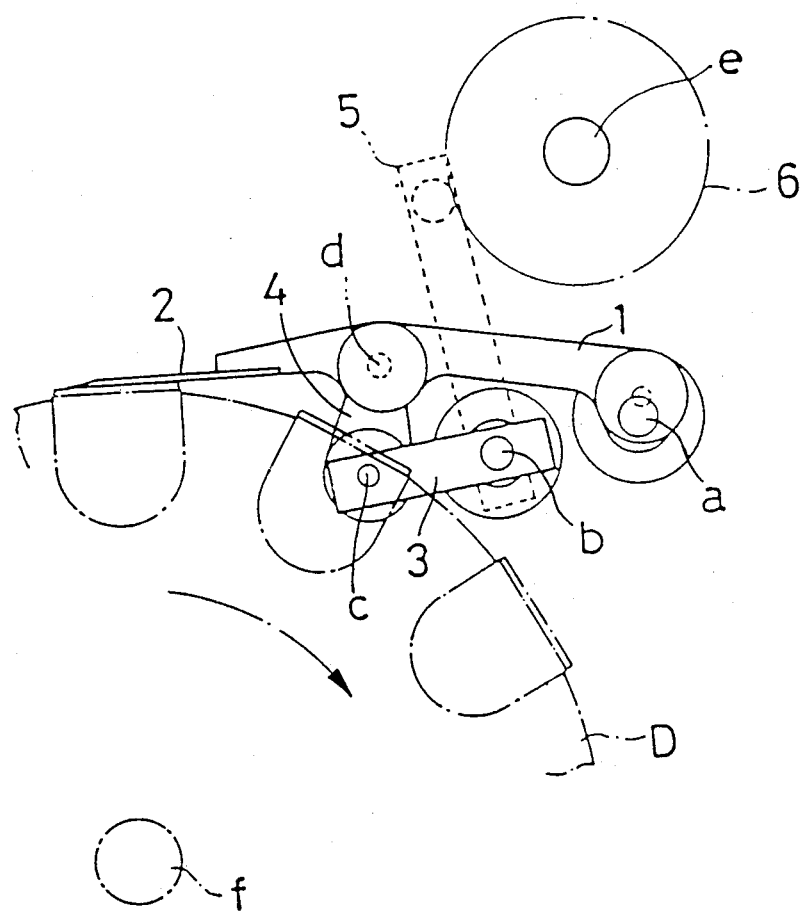
FIG. 3 is a front view of a device in accordance with the teachings of the present invention.
Figure 4:
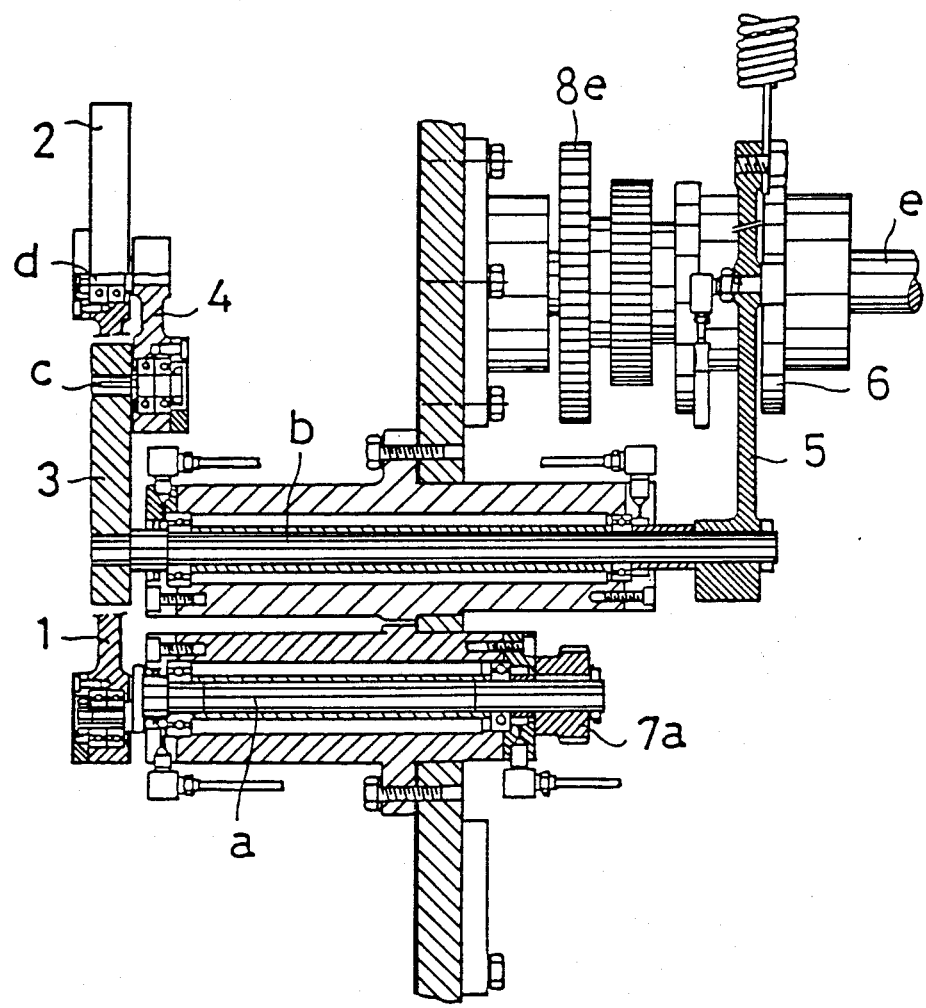
FIG. 4 is a partial cut-away plan view of FIG. 3.

The package contact-bonding device F is, as shown in FIGS. 3 and 4, basically constructed of an actuating member 1 which is provided concentrically with regard to a shaft a and a pusher plate 2 mounted on the top end of the actuating member 1. Except for this shaft a, the shafts b and c, which are in parallel with each other, are provided on lever 3 which is between the shafts b and c. The end of another lever 4 is freely mounted on the shaft c, the top end of the lever 4 being freely coupled to a shaft d provided on the top end of the actuating member 1.

Figure 5:
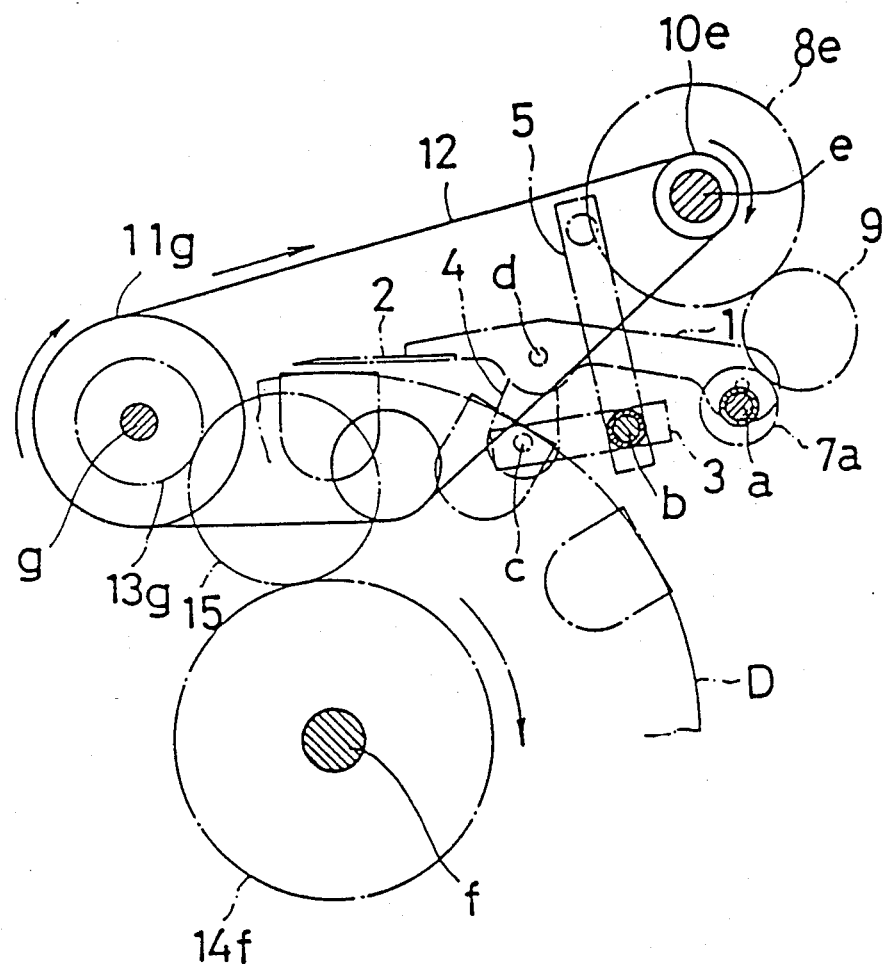
FIG. 5 is a front view illustrating one example of an interlocking mechanism for the device in accordance with the teachings of the present invention.

A cantilever 5 is firmly mounted on the shaft b. While being opposite to the fixing position of the lever 3, the end of the cantilever 5 meshes with cam 6 provided on the shaft e. The shafts a and e and the shaft f of the bucket wheel D are interlocked with each other. As one example of such an arrangement, as shown in FIG. 5, gear $7a$ is firmly mounted on the shaft a and the gear $7a$ engages with intermediate gear 9 and with gear $8e$ firmly mounted on the shaft e. The shaft e is provided with a wheel $10e$ and one belt hung between the wheel $10e$. The wheel $11g$ is provided on the shaft g which is provided near to the shaft f. A gear $13g$ is provided on the shaft g and the gear $13g$ engages through an intermediate gear 15 with a gear $14f$ provided on the shaft f.

The foregoing construction causes the shaft a to make rotational motion clockwise in FIG. 5 interlocked with the rotational motion in the direction of the arrow in the same drawing of the shaft f of the bucket wheel D so that the actuating unit 1 take an eccentric motion.

On the other hand, the rotational motion in the direction of the arrow in FIG. 5 (clockwise) causes the cam 6 provided on the shaft 4 to make rotational movement and the cam lever 5 engaged with the cam 6 is vibratingly moved with the shaft b as a sensor. In response to this motion the shaft b makes a clockwise or counterclockwise rotational motion in FIG. 5 and the lever 3 provided on the shaft b and the lever 4 between the shaft c and the top end of the lever 3 and the shaft d on the top side of the actuating article 1 are interlocked with each other. The interactive motion of levers 3, 4 and 5 actuates the pusher plate fixed to the top end of the actuating article 1. Therefore, the pusher plate describes a locus as shown in FIG. 6.

Figure 6:
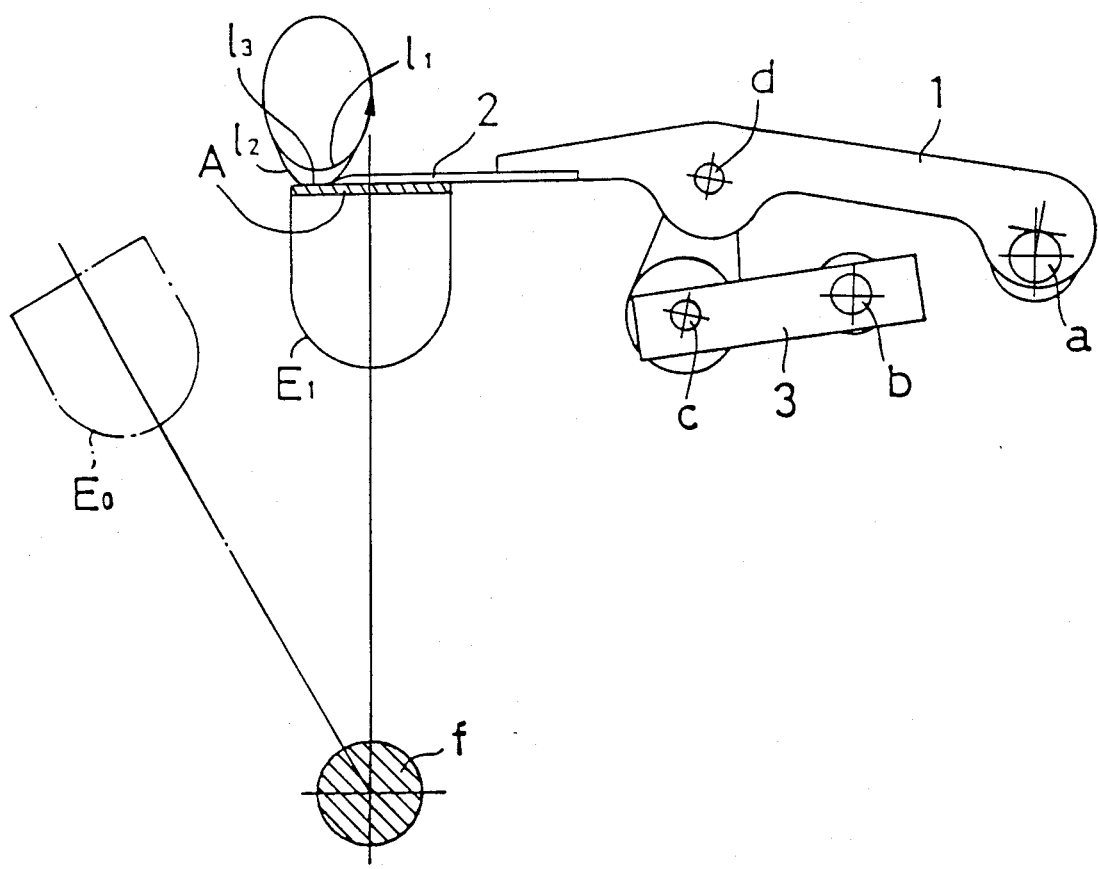
FIG. 6 is an enlarged front view of the locus described by the pusher plate of the present invention.
Figure 7:
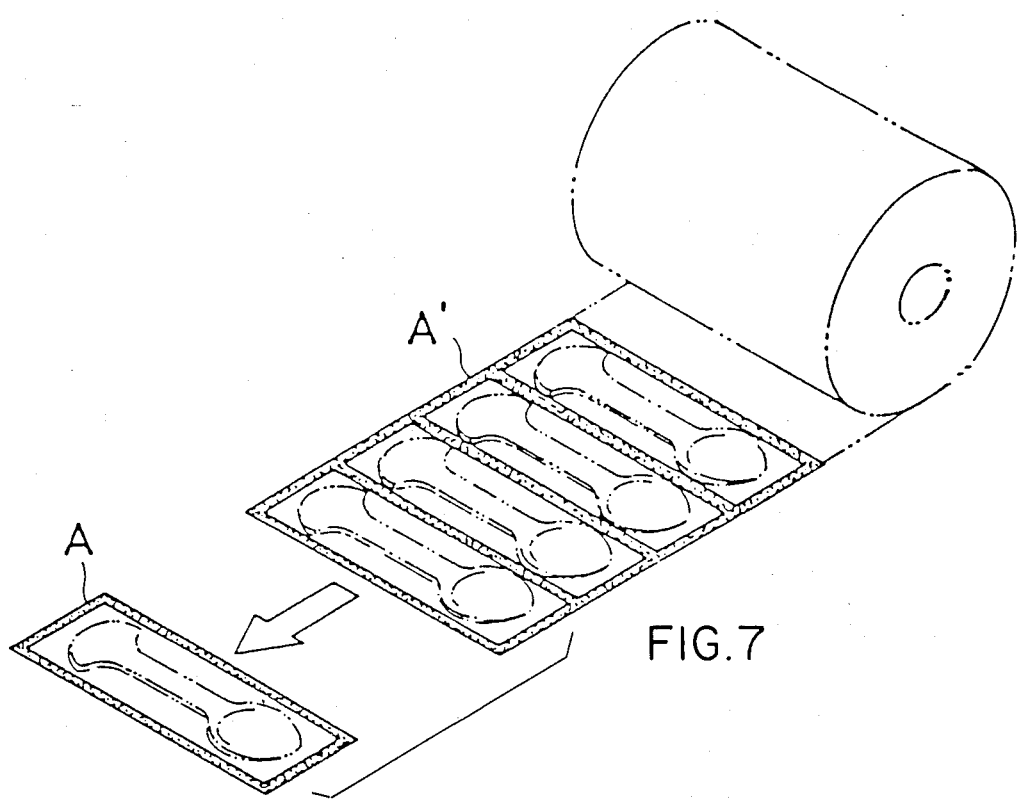
FIG. 7 is a perspective view of one example of a continuous package.
Figure 8:
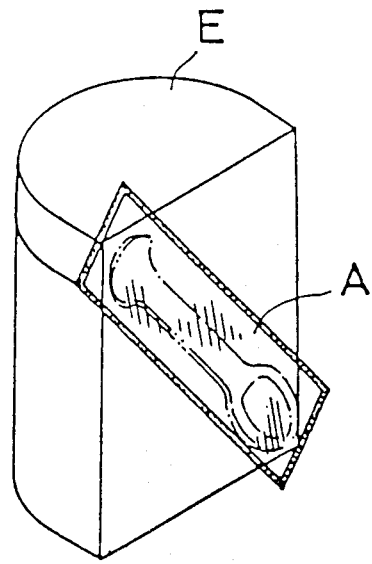
FIG. 8 is a perspective view illustrating the state in which one of the continuous packages is adhered to the package container.

The length of the circumference of this locus is obtained by dividing by an integral number the integral between the package container shown by the chain line $E_0$ in FIG. 6 on the circumference of the bucket wheel D and the package container shown by the full line $E_1$ in the same Figure, in other words integral between the adhering work by the bucket wheel D. Such a length tends to reduce the working range of the pusher plate to as much as possible.

Since the pusher plate 2, which always continues to be actuated, does not need to perform the adhering work when the package container which is fed by the rotation of the bucket wheel D to the location at the position shown by the chain line $E_0$ of FIG. 6, the pusher plate 2 describes a locus $l_1$ and does not need to be in contact with the external periphery thereof. Since there is no necessity of performing the adhering work when the package container is located at the position shown by the full line $E_1$ of FIG. 6, the pusher plate 2 describes a locus $l_2$ and contacts the external periphery of the bucket wheel D and presses against the external end face of the package container E. In that state, an approximately horizontal straight line $l_3$ exists on part of the locus $l_2$. Such an arrangement tends to actuate the pusher plate 2 in a tangential direction of the bucket wheel D and furthermore, the pusher plate 2 is adapted to be actuated at a speed approximately identical to the peripheral velocity of the bucket wheel D.

Thus, when the pusher plate 2 is not need to perform adhering work, the pusher plate 2 is actuated without being in contact with the external periphery of the bucket wheel D; whereas when it is needed to perform the adhering work, the pusher plate 2 acts as the contact-bonding device. In that state, the actuating direction of the pusher plate is one which is tangential to the bucket wheel D and its speed is approximately identical to the peripheral velocity of the bucket wheel D.

If the constructions is made as states above, the package A put onto the package container E is contact bonded to the package container E without being scrubbed by the pusher plate 2 when housing the package container E in the receiving part provided on the external periphery of the bucket wheel D and adhering to package A to the package container E while rotating the bucket wheel D. In other words, since the pusher plate 2 makes only the special motion described above, the pressing position of the pusher plate 2 against the package A, i.e. the actuating point of the pusher plate 2, does not slip in spite of the motion of the package container E. For this reason, the pusher plate 2 performs the pressing process without scrubbing the package A.

As a result and in accordance with the present invention, the pusher plate and the bucket wheel D are moved in synchronism with each other with extreme simplicity using only a mechanical combination and without using any complicated electrical circuitry or signals. Furthermore, since the pusher plate 2 is actuated in a tangential direction of the rotational unit and at the same time is actuated at a speed approximately identical to the peripheral velocity of the bucket wheel, the state of the article to be adhered is stable and derailing of the article to be adhered from the package container does not take place. Furthermore since it is possible to minimize the actuating range of the pusher plate 2, the insulation of the present invention may be performed at a place where space is available though extremely limited and all measurements of the adhering device may be made as small as possible.

Figure 9:
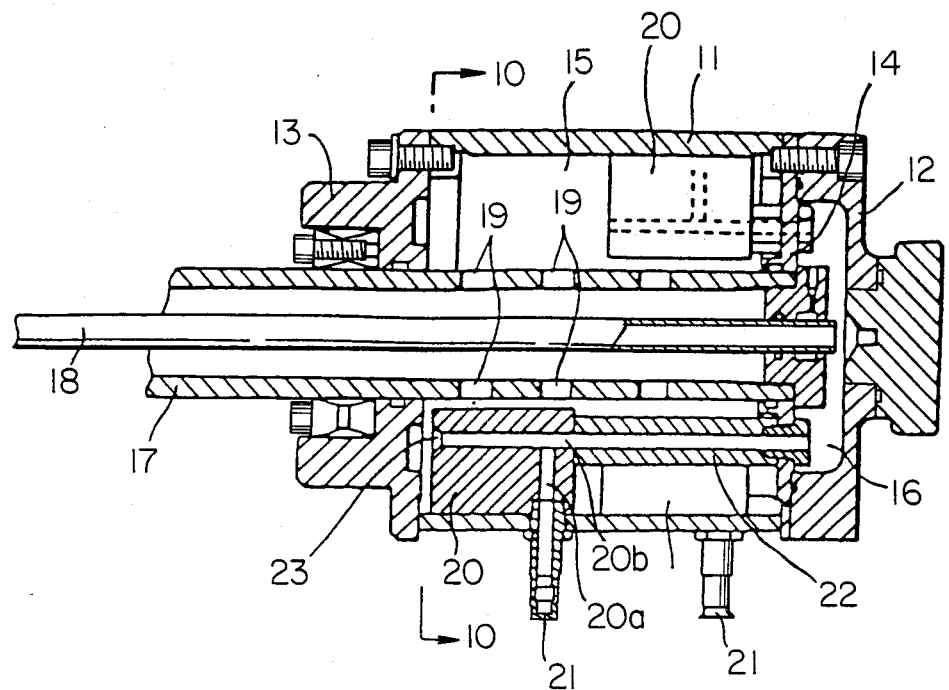
FIG. 9 is a longitudinal sectional view of a transmission drum in accordance with the teachings of the present invention.
Figure 10:
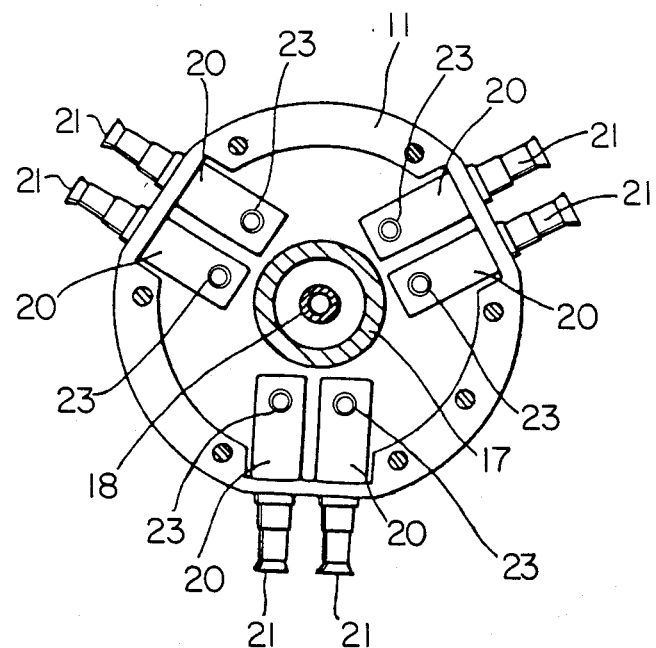
FIG. 10 is a sectional view along the line 10—10 in FIG. 9.

At this time the transferring means will now be described with reference to FIGS. 9 and 10. The transferring drum is rotatably driven and is a cylinder and hollow inside. The ends of the transferring drum are closed tight by means of lids 12 and 13 and the inside is divided into a void chamber 15 and a pressure chamber 16 by an airtight partition wall 14. Double lines, internal and external, of exhaust pipes 17 and air pipe 18 are inserted along the rotary shaft line of the transferring drum 11 so that the exhaust pipe 17 and the air pipe 18 have openings so the void chamber 15 and the pressure chamber 16, respectively.

Although the illustrated embodiment has an exhaust pipe 17 fixed to the transferring drum 11 so that the exhaust pipe 17 also serves as the driving shaft, an alternative is to equip the transferring drum with a separate driving device and to make the exhaust pipe 17 a fixed shaft. A further alternative would be to have the end of the exhaust pipe 17 open to the void chamber 15, although in the preferred embodiment the exhaust pipe 17 penetrates the void chamber 15 with a plurality of vent holes 19 being adequately provided.

A plurality of Venturi tubes 20 which are provided in the void chamber 15 communicate with the suction pipes 21 by a vacuum generating circuit 20a which extends outwardly and at the same time to a pressure circuit 20b which communicates with the pressure chamber 16 by means of a connecting pipe 12. In operation, high pressure air which is supplied from a high pressure air source such as a compressor (not shown) passes through the air pipe 18 and reaches the inside of the pressure chamber 16. From the pressure chamber 16, the high pressure air passes through the connecting pipe 22 and is supplied to the Venturi tubes 20 whereby a vacuum pressure which is constantly stabilized which is constantly generated in the suction pipe 21 and the high pressure air is subsequently discharged from an exhaust hole 23 of the Venturi tubes 20 to the void chamber 15 and passes through the vent hole 19 and is discharged from the machine by means of the exhaust pipe 17.

At that time, if the pressure chamber 16, being a void, has a larger capacity than required, the pressure chamber 16 serves as a tank so that the air pressure is stabilized and stabilized air is supplied to the Venturi tubes 20 even when flucuation in the air pressure supply occurs due to pulsing high pressure air as well as air leakage. In this way the suction force of the suction pipes 21 can be constantly maintained. Accordingly, the transmission drum operates reliably regardless of any air leakage from one of the plurality of suction pipes as well as any actuation of any of the other suction pipes. Furthermore since the air can always ventilate a plurality of Venturi tubes 20, the movable parts such as a valve mechanism which must be accurately actuated are not needed, although conventional type transfer drum utilizing a vacuum air source need them. As a result the transfer drum of Applicant's invention reduces the probability of problems. In addition, when compared with transfer drum devices using a single vacuum source the device of the present invention can compensate for higher running costs by maintaining a constant high degree of vacuum with a comparatively low cost compressure for generating higher pressure air, etc., and additionally by reducing the necessity of repairs so that the device has a low running cost.

It should be apparent that the above-described embodiments are merely illustrative of but a few embodiments of the present invention which employ the objects and principals of the present invention. Numerous and other varied arrangements can be readily devised by those skilled in the art without departing from the spirit and scope of the present invention.

I claim:

1. In an adhering device of the type including a roll of long, narrow, continuous package, a means for feeding the continuous package to a cutter, a bucket wheel from picking up the commodity and transferring the commodity to an adhering position and means for transferring the cut continuous package to the adhering position and for adhering the cut package to the commodity, said means for transferring and adhering comprising:

a vacuum transfer device comprising:
   a rotatable transfer drum;
   a plurality of suction pipes provided uniformly about a periphery of the transfer drum;
   a source of compressed air;
   a void chamber provided in said drum;
   a plurality of Venturi tubes for generating a vacuum provided in said void chamber and communicating each with a suction pipe; and
   a pressure chamber provided in said drum to which said compressed air is supplied and which supplies compressed air to each of said Venturi tubes; and
a pusher plate which receives the cut continuous package from the vacuum transfer device and adheres it to the commodity, said pusher plate being characterized in that it is adapted to make a combined movement including a circular movement in synchronism with a movement of said bucket wheel and a movement in a direction tangential to said bucket wheel.

2. A device according to claim 1, further comprising a shaft about which said transfer drum is rotatable and wherein said compressed air is supplied to said pressure chamber through said shaft.

3. A device according to claim 2, wherein said shaft further includes exhaust means communicating with said void chamber for exhausting compressed air which has passed through said Venturi tubes.

4. A device according to claim 1, further comprising cam means synchronized with said bucket wheel for moving said pusher plate.

* * * * *